US008142523B2

(12) United States Patent
Cyr et al.

(10) Patent No.: US 8,142,523 B2
(45) Date of Patent: Mar. 27, 2012

(54) ELECTROCHEMICAL BATTERY AND METHOD FOR MAKING SAME

(75) Inventors: Nicolas Cyr, Greenfield Park (CA); Martin Burns, Chambly (CA); Frederic Lague, Boucherville (CA)

(73) Assignee: Bathium Canada Inc., Boucherville (CA)

( * ) Notice: Subject to any disclaimer, the term of this patent is extended or adjusted under 35 U.S.C. 154(b) by 0 days.

(21) Appl. No.: 13/112,623

(22) Filed: May 20, 2011

(65) Prior Publication Data

US 2011/0219608 A1 Sep. 15, 2011

Related U.S. Application Data

(62) Division of application No. 11/302,257, filed on Dec. 14, 2005, now abandoned.

(51) Int. Cl.
*H01M 6/00* (2006.01)

(52) U.S. Cl. .......................... 29/623.1; 429/152; 429/149

(58) Field of Classification Search .................... 429/152
See application file for complete search history.

(56) References Cited

U.S. PATENT DOCUMENTS

| | | | |
|---|---|---|---|
| 6,230,406 | B1 | 5/2001 | Balfour et al. |
| 6,849,358 | B2 | 2/2005 | O'Connell |
| 7,180,040 | B2 | 2/2007 | Jones |
| 7,541,112 | B2 | 6/2009 | Richard et al. |
| 2004/0028999 | A1* | 2/2004 | Richard et al. ............... 429/149 |

FOREIGN PATENT DOCUMENTS

| | | |
|---|---|---|
| CA | 2482864 A1 | 11/2003 |
| CA | 2316504 C | 11/2005 |
| EP | 0199476 A2 | 10/1986 |
| EP | 0869564 A1 | 10/1998 |
| EP | 1049180 A1 | 11/2000 |
| JP | 2001325945 A2 | 11/2001 |
| WO | 2002/09212 A1 | 1/2002 |
| WO | 2003/094258 A3 | 11/2003 |
| WO | 2005/101545 A1 | 10/2005 |

OTHER PUBLICATIONS

International Search Report of PCT/CA2006/002048; Nancy McMartin, Apr. 12, 2007.
English Abstract of Japanese Application JP2001325945 Published on Nov. 22, 2001.

* cited by examiner

*Primary Examiner* — Patrick Ryan
*Assistant Examiner* — Brent Thomas
(74) *Attorney, Agent, or Firm* — McMillan LLP

(57) ABSTRACT

A method for making a battery is disclosed which comprises providing a plurality of Electrochemical Cell (EC) bundles; providing a current collecting terminal having first and second ends; electrically connecting the projections of the sheet like electrodes extending from one end a first EC bundle together via the first end of the current collecting terminal; electrically connecting the projections of the sheet like electrodes extending from one end of a second EC bundle together via the second end of the current collecting terminal such that the first and second EC bundles are mechanically and electrically connected together and form a string of at least two EC bundles; and folding the string of at least two EC bundles by bending the current collecting terminal connecting the at least two EC bundles together such that the first and second EC bundles are positioned in a side by side relationship.

9 Claims, 10 Drawing Sheets

US 8,142,523 B2

ELECTROCHEMICAL BATTERY AND METHOD FOR MAKING SAME

CROSS-REFERENCE

This application claims priority from and is a divisional of U.S. patent application Ser. No. 11/302,257 filed Dec. 14, 2005, the entirety of which is incorporated herein by reference.

FIELD OF THE INVENTION

The present invention relates to electrochemical (EC) batteries and, more specifically to current collecting terminals that are used to connect electrochemical (EC) bundles together. This invention also concerns a method for connecting EC bundles together using such current collecting terminals, in order to make a battery.

BACKGROUND OF THE INVENTION

In recent years, the field of electrochemical equipment and, more specifically, that of energy storage devices (i.e., batteries) has generally been characterized by a certain effervescence. In fact, ever increasing and evolving demand, research and development, and greater competition in the market place are all factors that are contributing to numerous innovations in this field. Moreover, manufacturers and users of EC devices are also envisioning alternate and diversified applications for these products.

The automotive industry, for example, has been seeking to commercialize a viable electrical vehicle for several decades now. An important element of such a vehicle is its battery. The battery must not only provide the requisite level of energy production but must also be durable. As a further example, the telecommunications industry also requires relatively durable and powerful batteries such as to provide a reliable and uninterruptible power source.

A number of advanced battery technologies have therefore been developed, such as metal hydride (e.g., Ni-MH), lithium-ion, and lithium polymer cell technologies, which would appear to provide the requisite level of energy production and safety margins for many commercial and consumer applications. Such advanced battery technologies, however, often exhibit characteristics that provide challenges for the manufacturers. In conventional battery design, individual cells are assembled together and hardwired to the positive and negative power terminals of the battery. Such advanced and complex batteries, however, are relatively difficult and expensive to manufacture. For example, individual EC cells, which generally form the basis of batteries, are usually connected to one another by welding their respective components (i.e., electrodes and the like) onto a current collecting terminal in order to form an EC bundle (batteries generally comprising one or more EC bundles). In addition to being tedious, such a process is time-consuming, labor intensive, and costly.

Considering this background, it clearly appears that there is a need in the industry to develop a simpler and more cost-efficient method for connecting EC cells in order to form an EC bundle and manufacture batteries.

SUMMARY OF THE INVENTION

Under a first broad aspect, the present invention provides a battery comprising a plurality of electrochemical (EC) bundles and at least one current collecting element. The plurality of electrochemical bundles each comprises a plurality of electrochemical cells (Ecs). Each electrochemical cell comprises a sheet-like positive electrode having a projection extending from a first end of the electrochemical cell, a sheet-like negative electrode having a projection extending from a second end of the electrochemical cell and an electrolyte between the electrodes. Each of the at least one current collecting terminals has a first end, a second end, a first conductive component and a second conductive component that both extend from the first end to the second end. The current collecting terminal mechanically and electrically connects the projections of the sheet-like electrodes extending from one end of the plurality of electrochemical cells of a first EC bundle together and mechanically and electrically connects the projections of the sheet-like electrodes extending from one end of the plurality of electrochemical cells of a second EC bundle together. The second EC bundle is adjacent to the first EC bundle, such that the current collecting terminal electrically connects the first EC bundle and the second EC bundle together.

In accordance with a non-limiting embodiment, the current collecting terminal, is made from ductile metallic material, and is mechanically connected to the sheet-like current collecting electrodes by a crimping process and/or by welding, riveting, soldering or adhesives.

Under a second broad aspect, the invention provides a method for making a battery. The method comprises:

a) providing a plurality of Electrochemical Cell (EC) bundles, each EC bundle comprising a plurality of Electrochemical Cells (ECs), each Electrochemical Cell comprising:
i) a sheet-like positive electrode having a projection extending from a first end of said Electrochemical Cell; ii) a sheet-like negative electrode having a projection extending from a second end of said Electrochemical Cell; iii) an electrolyte between said electrodes;

b) providing a current collecting terminal having a first end and a second end; electrically connecting the projections of the sheet like electrodes extending from one end a first EC bundle together via the first end of the current collecting terminal; electrically connecting the projections of the sheet like electrodes extending from one end of a second EC bundle together via the second end of the current collecting terminal such that the first EC bundle and the second EC bundle are mechanically and electrically connected together and form a string of at least two EC bundles; and c) folding the string of at least two EC bundles by bending the current collecting terminal connecting the at least two EC bundles together such that the first EC bundle and the second EC bundle are positioned in a side by side relationship.

Under a third broad aspect, the invention provides a current collecting terminal for use in an electrochemical battery. The electrochemical battery comprises a plurality of electrochemical bundles each having a plurality of cells. Each cell comprises a pair of sheet-like electrodes, electrolyte between the electrodes, and a sheet-like current collecting element in electrical communication with, and projecting from, at least one of the sheet-like electrodes. The current collecting element also has a pair of generally opposite main faces. The current collecting terminal electrically connects a pair of EC bundles from the plurality of EC bundles. The current collecting terminal has a first end and a second end, and comprises a first conductive component and a second conductive component. At the first end of the current collecting terminal, the first conductive component and the second conductive component each overlap a main face of respective sheet-like current collecting elements of a first EC bundle from the plurality of EC bundles. The first conductive component and the second conductive component are in electrical communication with the first EC bundle. At the second end, the first conductive component and the second conductive component each overlap a main face of respective sheet-like current collecting elements of a second EC bundle from the plurality of EC bundles. The first conductive component and the second conductive component are in electrical communication with the second EC bundle.

Under a fourth broad aspect, the invention provides a battery comprising a plurality of electrochemical (EC) bundles. Each EC bundle comprises a plurality of cells that each comprise a pair of sheet-like electrodes, electrolyte between the electrodes and a sheet-like current collecting element in electrical communication with, and projecting from, at least one of the sheet-like electrodes. The current collecting element has a pair of generally opposite main faces. At least one current collecting terminal electrically connects a pair of EC bundles from the plurality of EC bundles. The current collecting terminal has a first end and a second end, and comprises a first conductive component and a second conductive component. At the first end, the first conductive component and the second conductive component each overlap a main face of a respective sheet-like current collecting element of a first EC bundle from the plurality of EC bundles. The first conductive component and the second conductive component are in electrical communication with the first EC bundle. At the second end, the first conductive component and the second conductive component each overlap a main face of a respective sheet-like current collecting element of a second EC bundle from the plurality of EC bundles. The first conductive component and the second conductive component are in electrical communication with the second EC bundle.

BRIEF DESCRIPTION OF THE DRAWINGS

A detailed description of examples of implementation of the present invention is provided hereinbelow with reference to the following drawings, in which:

FIG. 4 is a schematic diagram of a manufacturing operation for connecting EC bundles together with the current collecting terminals shown in FIG. 3a;

FIG. 5 is a partial cross-sectional view of two EC bundles positioned side-by-side and connected via a current collecting terminal as shown in FIG. 3a;

Figure 1A:
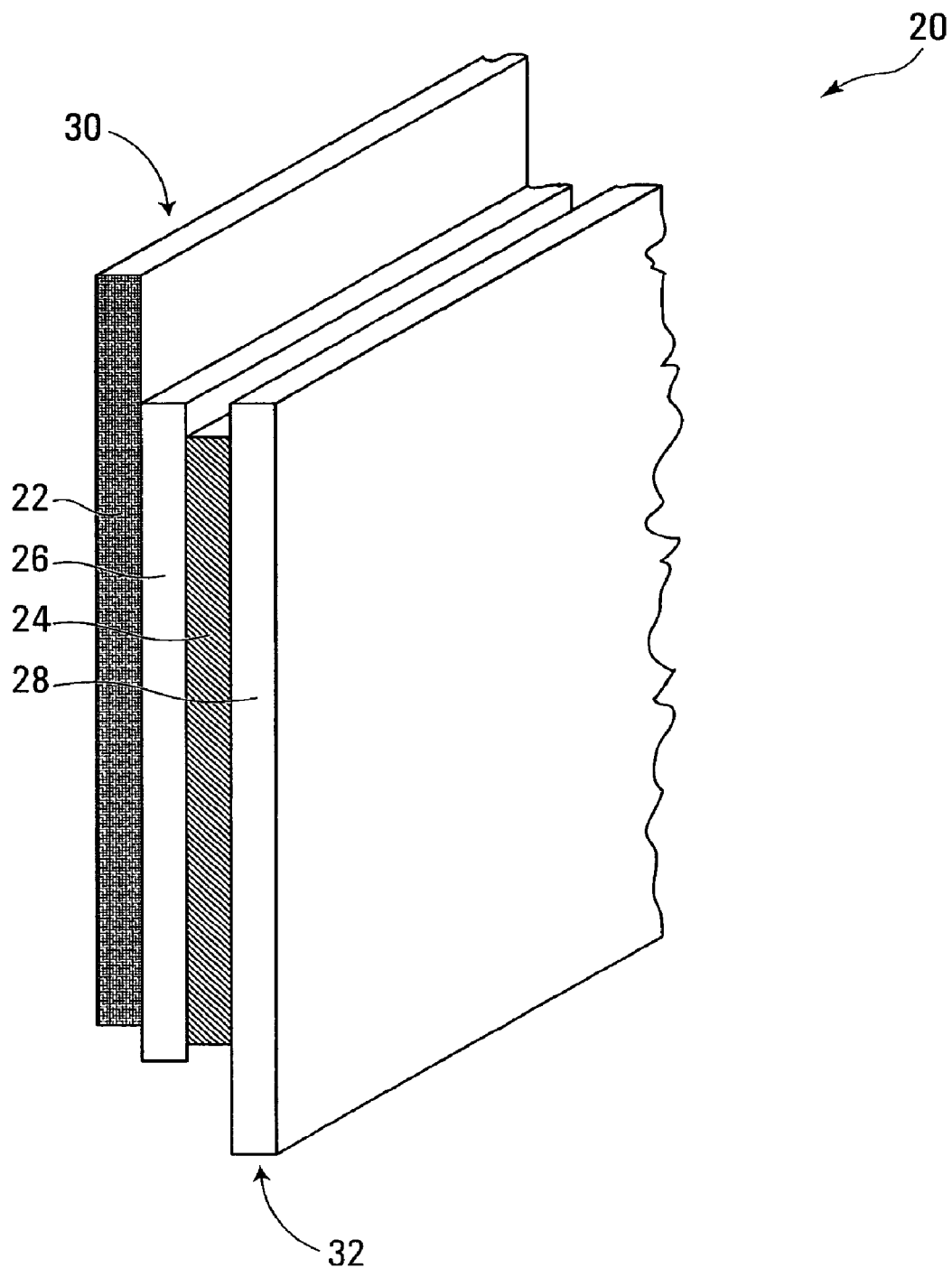
FIG. 1A is a schematic perspective view of a typical mono-face electrochemical (EC) cell.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

With reference to FIG. 1A, there is shown an example of a typical electrochemical (EC) cell 20 in a mono-face configuration. As shown, EC cell 20 comprises a negative sheet-like electrode 22 (generally referred to as an anode), a positive sheet-like electrode 24 (generally referred to as a cathode), and an electrolyte 26 interposed between the former and the latter. In addition, a sheet-like cathode current collecting element 28 is positioned adjacent to the cathode 24. In a monoface configuration, only one face of the current collecting element 28 is coated with a cathode 24. As shown, anode 22 is offset with respect to the current collecting element 28. Anode 22 extends from a first end 30 of the EC cell 20 while cathode current collecting element 28 extends from a second end 32 of the EC cell 20 such as to expose the anode 22 and the cathode current collecting element 28 for electrical connection later on in the manufacturing process. Each of the above components will now be described in greater detail.

In a preferred embodiment, anode 22 is a lithium or lithium alloy metallic sheet or foil, which acts both as a cation source and as a current collector. Anode 22 may also comprise an anode current collecting element distinct from the active anode material (not shown). For instance, anode 22 may be a composite comprising an anode current collecting element preferably made of a thin sheet of copper, a polymer, an electronic conductive filler, and an insertion or intercalation material. Examples of the electronic conductive filler include but are not limited to: conductive carbon, carbon black, graphite, graphite fiber, and graphite paper. Any anode insertion material known to those skilled in the art may be used and, in particular, may be selected from the group consisting of: carbon, activated carbon, graphite, petroleum coke, a lithium alloy, nickel powder, and lithium intercalation compound. The anode may further comprise a lithium salt. Other materials can, however, also be used to form anode 22. Although FIG. 1A does not depict anode 22 as including a structurally distinct current collecting element, it should be expressly understood that an anode having such a feature remains within the scope of the present invention. A distinct current collector for the anode is typically made of copper.

With respect to cathode 24, the latter typically comprises a compound of a polymer, a lithium salt, and electrochemically active material. Examples of suitable electrochemically active materials include: $Li_xV_yO_z$; $LiCoO_2$; $Li_xMn_yO_z$; $LiNiO_2$; $LiFePO_4$; $V_xO_y$; $Mn_yO_z$; $Fe(PO_4)_3$; or $Li_xTi_yO_z$. In a preferred embodiment, cathode 24 preferably comprises lithiated iron phosphate ($LiFePO_4$). Any other suitable active material can, however, be used to form the cathode 24.

Electrolyte 26, which is preferably, but not necessarily, a solid or a gel made of polymer mixed with a lithium salt, physically separates and electronically isolates the anode 22 from the cathode 24 and acts as an ion transporting medium between the anode 22 and the cathode 24.

Current collecting element 28, which serves the primary function of conducting the flow of electrons between the active material of cathode 24 and the terminals of a battery (not shown), is typically constructed of materials such as copper, nickel, aluminum, and the like. In a preferred embodiment, current collecting element 28 for cathode 24 comprises an aluminum sheet or foil coated with a thin protective layer having an electronic conductive element such as carbon or graphite. This protective layer prevents degradation of the current collecting element when the latter is in contact with the cathode compound.

Figure 1B:
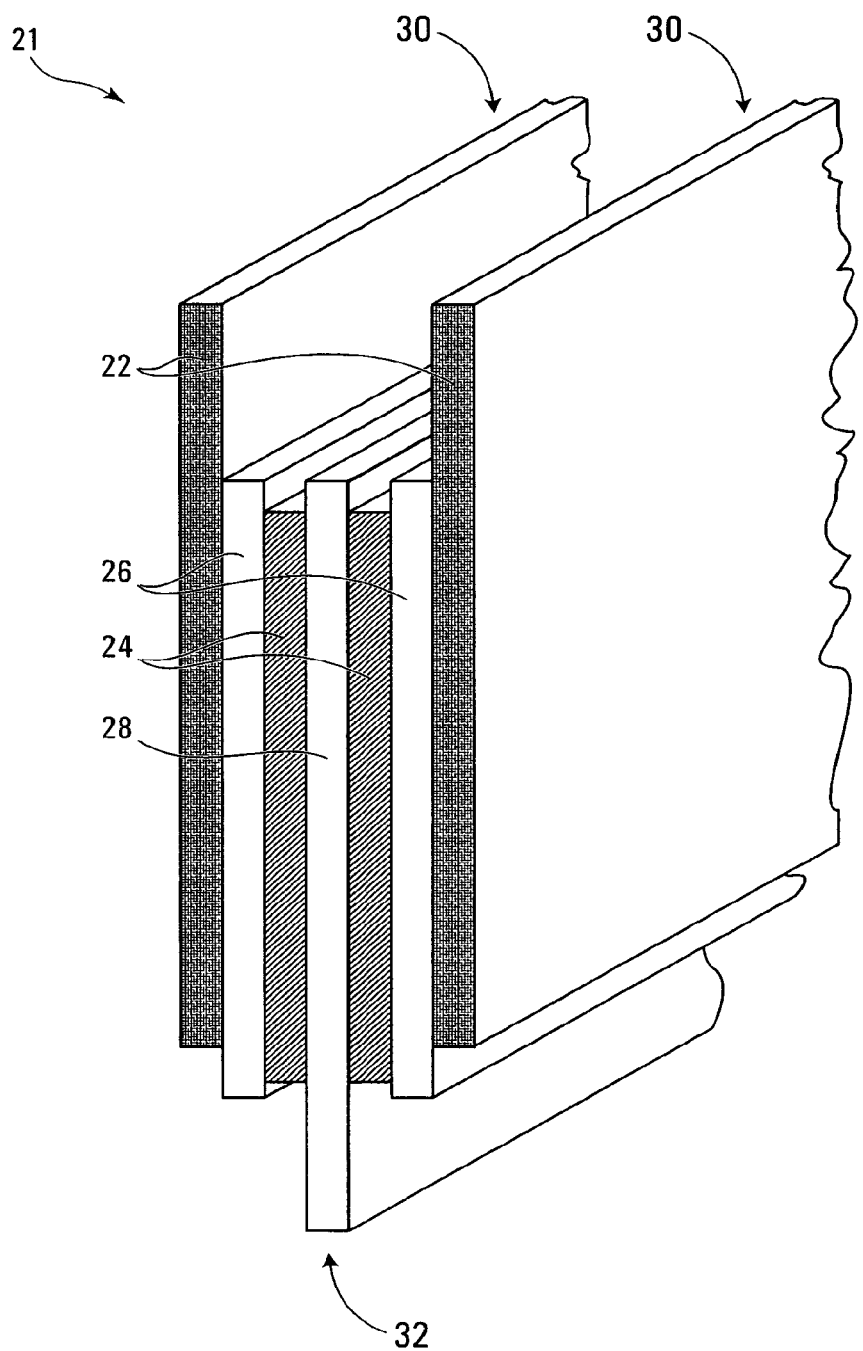
FIG. 1B is a schematic perspective view of a typical bi-face electrochemical (EC) cell.

Shown in FIG. 1B is an example of a typical electrochemical EC cell 21 in a bi-face configuration, wherein both faces of the current collecting element 28 are coated with cathode material 24. A bi-face configuration uses a single current collecting element 28 for two elementary cells thereby significantly reducing the overall weight of the assembly of EC cells. As shown in FIG. 1B, the bi-face EC cell 21 comprises a central sheet-like current collecting element 28 extending from a first end 32 of the EC cell 21, a layer of cathode material 24 laminated on each side of the central current collecting element 28, an electrolyte layer 26 covering each layer of cathode material 24 and separating the layers of cathode material 24 from adjacent anode lithium foils 22 laminated on each electrolyte layer 26 and extending from the opposite end 30 of the EC cell 21. The bi-face EC cell 21 configuration provides higher energy density and does not require insulating films between bi-face EC cells 21 when assembled in a side-by-side relationship, or when stacked. This is due to the fact that the anodes 22 of adjacent cells end up being in contact with each other and there can be no short circuit between similar anodes. This eliminates the insulating film components and further increases the overall energy density of an assembly of EC cells 21.

Energy storage devices, which are more commonly known as batteries, include a plurality of EC cells such as those shown in FIGS. 1A and 1B, or alternatively a plurality of layers of the same EC cell when the latter is wound or rolled to form a battery. The positive and negative ends of EC cells are generally grouped together and electrically connected together to form one or more EC bundles for a battery.

Figure 2:
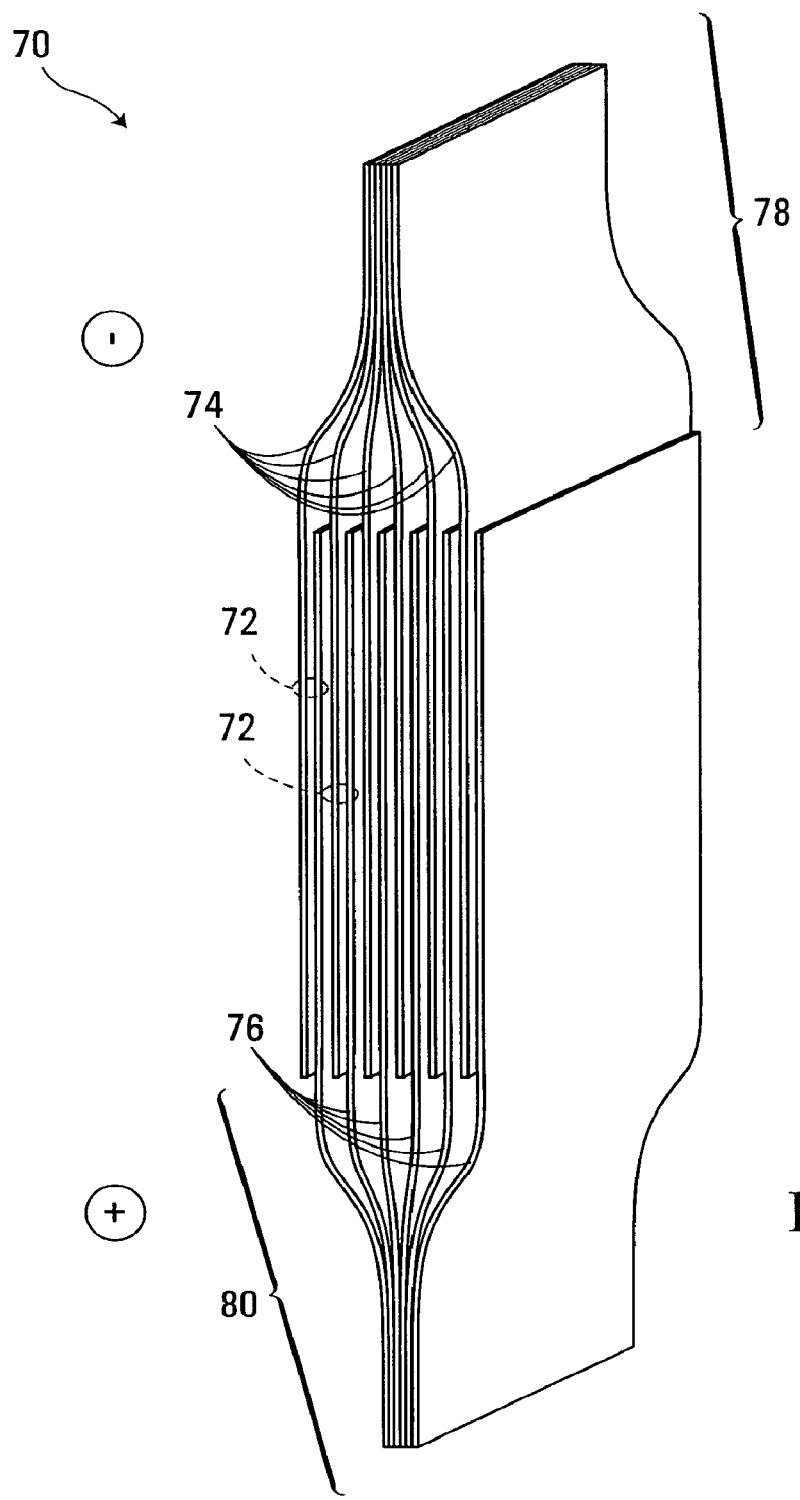
FIG. 2 is a schematic perspective view of a plurality of individual EC cells that are assembled in order to form an electrochemical bundle according to a non-limiting example of implementation of the present invention, several basic components of the EC cells having been omitted from the figure for the sake of clarity.

FIG. 2 depicts a specific embodiment of an EC bundle 70 according to the present invention. As shown, EC bundle 70 includes a plurality of individual EC cells 72, which are disposed in a side-by-side relationship. Each of the individual EC cells 72 includes, among other components, an anode current collecting element 74 extending from one end 78 of the EC bundle 70, and a cathode current collecting element 76 extending from the other end 80 of the EC bundle 70. Note that the anode current collecting element can be structurally integral with its corresponding electrode or distinct therefrom, as discussed previously. The anode current collecting elements 74 of the individual EC cells 72 are all grouped together on side 78 of the bundle 70 while the cathode current collecting elements 76 are grouped together on side 80 of the same bundle 70. In mono-face configurations, the individual EC cells of a bundle are separated by a thin insulating film of plastic material (not shown), such as polypropylene, to prevent short circuiting between individual cells 72. However, in bi-face configurations, the individual EC cells of a bundle are assembled side by side without insulating films since the anodes 22 of adjacent cells are in contact with other anodes 22, and there can be no short circuit between similar anodes as previously mentioned.

As further shown in FIG. 2, the anode current collecting elements 74 converge together and are in electrical connection with one another via their respective main faces; the latter being in loose physical contact. Similarly, the cathode current collecting elements 76 converge together and are in electrical connection with one another via their respective main faces; the latter being in loose physical contact.

Although FIG. 2 schematically shows an EC bundle 70 comprising six individual EC cells 72, it should be expressly understood that an EC bundle comprising any number of individual EC cells 72 remains within the scope of the present invention.

Figure 3A:
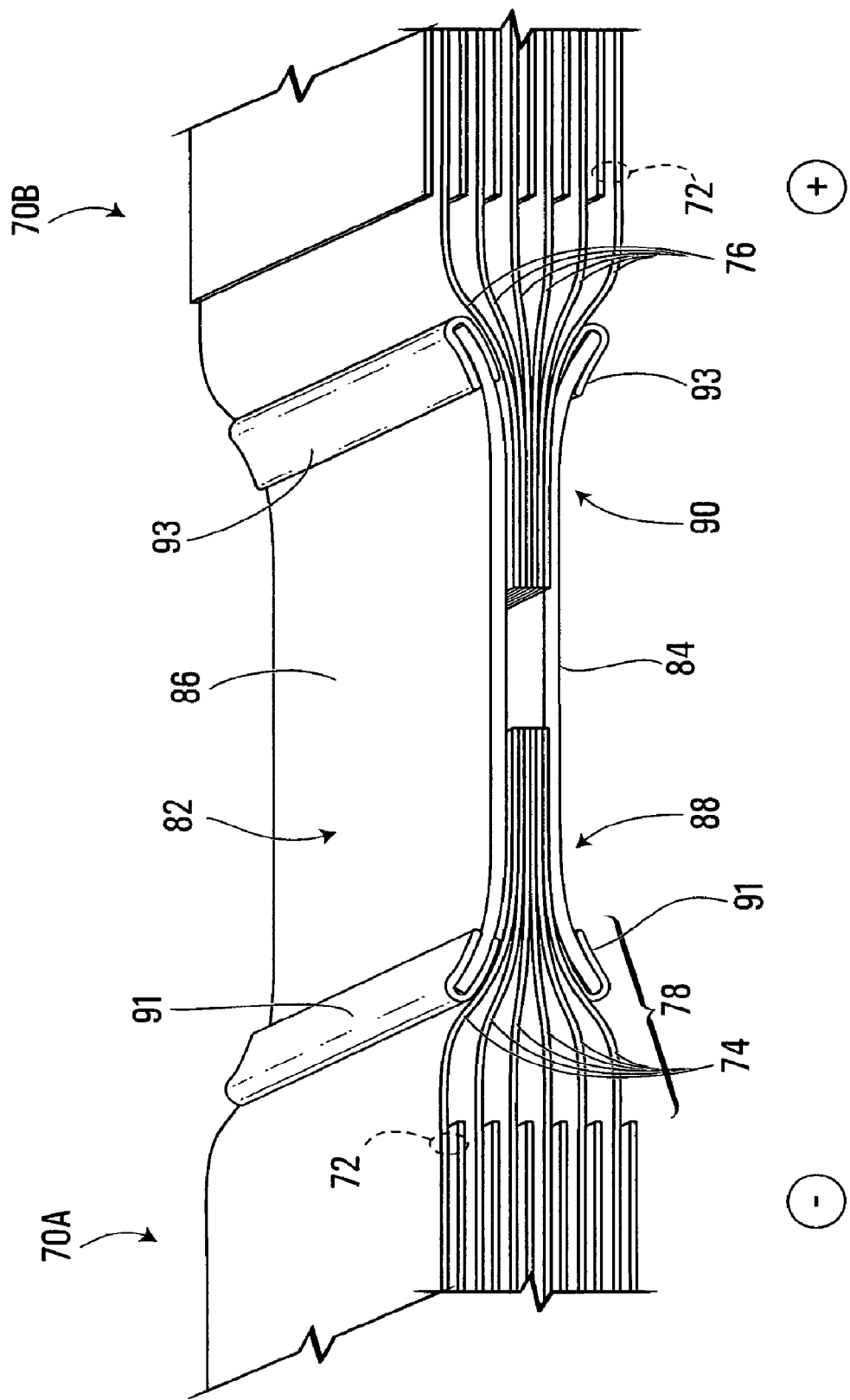
FIG. 3A is a perspective view of two bundles of EC cells joined together by a current collecting terminal in accordance with a non-limiting example of implementation of the present invention.

Shown in FIG. 3A is a current collecting terminal 82 in accordance with a non-limiting embodiment of the present invention. The current collecting terminal 82 is electrically connecting two electrochemical bundles 70A and 70B together in series. As shown, the current collecting terminal 82 electrically connects the anode current collecting elements 74 of a first EC bundle 70A to the cathode current collecting elements 76 of a second EC bundle 70B. It should be appreciated that in alternative embodiments, the current collecting terminal 82 is operative for electrically connecting two EC bundles 70A and 70B together in parallel. In such a situation, the current collecting terminal 82 would be operative to connect the anode current collecting elements 74 of a first EC bundle 70A to the anode current collecting elements 74 of a second EC bundle 70B, or alternatively, the cathode current collecting elements 76 of a first EC bundle 70A to the cathode current collecting elements 76 of a second EC bundle 70B.

In the embodiment shown in FIG. 3A, the current collecting terminal 82 has a first end 88 and a second end 90, and further includes a first conductive component 84 and a second conductive component 86. Both the first conductive component 84 and the second conductive component 86 extend from the first end 88 to the second end 90 of the current collecting terminal. While the first and second conductive components 84 and 86 of the current collecting terminal 82 are preferably made of copper, they can also be made of any other ductile and conductive material such as brass, gold, silver, aluminum, and alloys thereof, without departing from the spirit of the invention.

In order to connect the two EC bundles 70A and 70B together, the current collecting terminal 82 receives the current collecting elements of the first and second EC bundles 70A and 70B between its first conductive component 84 and its second conductive component 86. More specifically, at its first end 88, the current collecting terminal 82 receives the current collecting elements 74 of the first EC bundle 70A between its first and second conductive components 84 and 86. As such, each of the conductive components 84 and 86 overlaps at least a portion of a main face of a respective current collecting element 74 of the EC bundle 70A. In the embodiment shown, the first and second conductive components 84 and 86 overlap a portion of the main faces of the two most exteriorly positioned current collecting elements of the first EC bundle 70A. As such, the current collecting terminal 82 is in electrical communication with the anode current collecting elements 74 of the first electrochemical bundle 70A.

At its second end 90, the current collecting terminal 82 receives the current collecting elements 76 of the second EC bundle 70B between its first and second conductive components 84 and 86. As such, each of the conductive components 84 and 86 overlaps at least a portion of a main face of a respective current collecting element 76 of the second EC bundle 70B. In the embodiment shown, the first and second conductive components 84 and 86 overlap a portion of the main faces of the two most exteriorly positioned current collecting elements of the second EC bundle 70B. As such, the current collecting terminal 82 is in electrical communication with the cathode current collecting elements 76 of the second electrochemical bundle 70B.

Although the first conductive component 84 and the second conductive component 86 overlap the main faces of respective ones of the current collecting elements 74 and 76, it should be understood that the first and second conductive components 84 and 86 are not necessarily in direct contact with these current collecting elements 74 and 76. For example, a sheet of conductive material may be positioned between the current collecting elements and the first and second conductive components 84 and 86.

As further shown in FIG. 3A, an insulation boot or tape 91 may be positioned at the extremities of the first and second conductive components 84, 86, at the first end 88, and an insulation boot or tape 93 may be positioned at the extremity of the first and second conductive components 84, at the second end 90. These insulation boots 91 and 93 act to prevent potential damage to the current collecting elements 74 and 76 with the sharp ends of the first and second conductive components 84 and 86, and to prevent any short-circuiting caused by such damage.

Figure 3B:
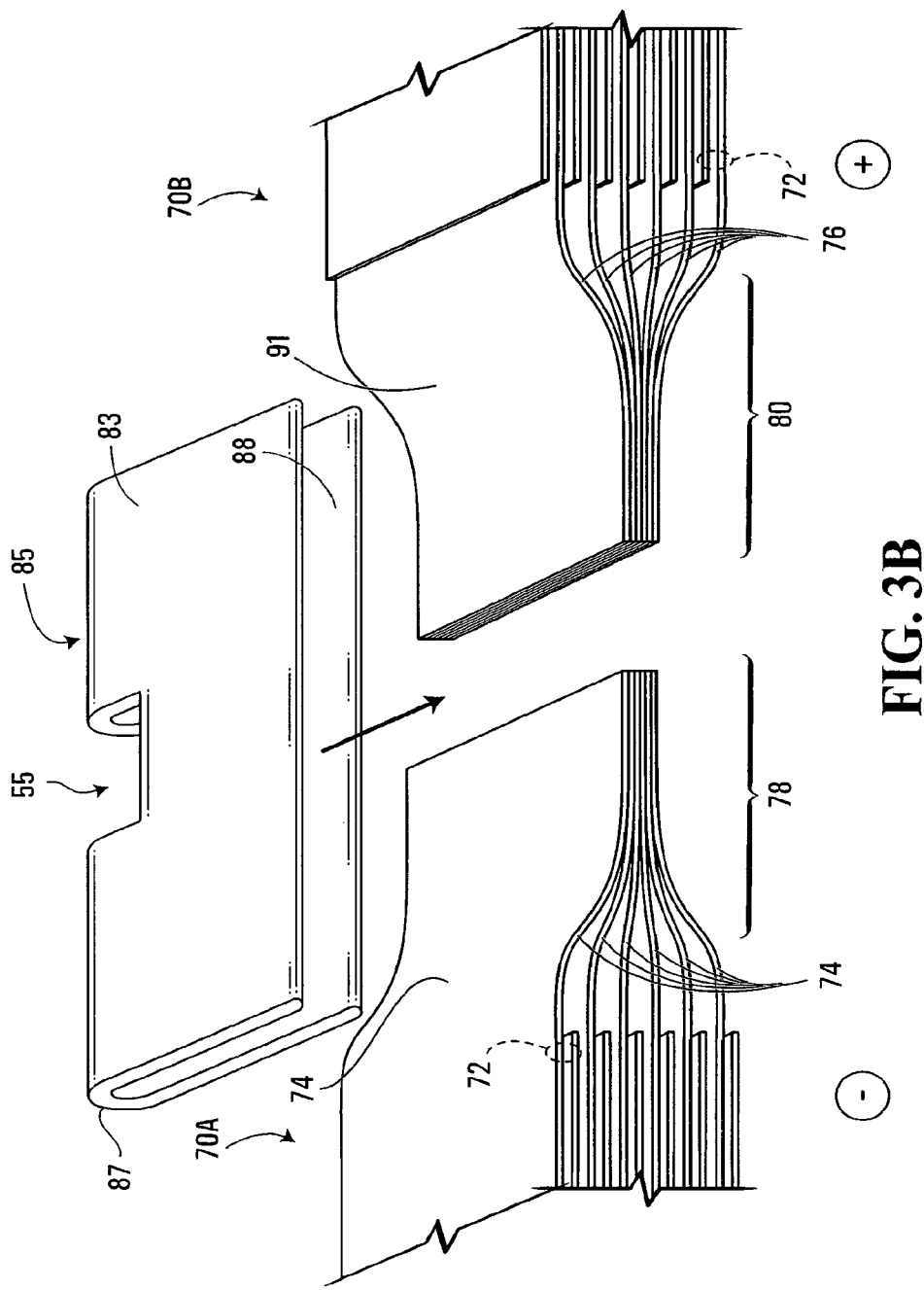
FIG. 3B is an exploded view of two bundles of EC cells that are to be joined together by a current collecting terminal in accordance with a second non-limiting example of implementation of the present invention.

In the non-limiting embodiments shown in FIGS. 2 and 3A, the first and second conductive components 84 and 86 of the current collecting terminal 82 are two separate components. It should, however, be appreciated that other embodiments are possible without departing from the spirit of the invention. For example, shown in FIG. 3B is a current collecting terminal 85 in accordance with an alternative embodiment. Current collecting terminal 85 is a single component that is able to interconnect two EC bundles 70 together. Current collecting terminal 85 is formed of a single sheet of conductive material that is configured into a generally U-shaped member. As such, the current collecting terminal 85 defines a first conductive component 83 and a second conductive component 88 for receiving therebetween the current collecting elements of two EC bundles 70A and 70B.

As shown in FIG. 3B, the base 87 of the U-shaped current collecting terminal 85 joins the first conductive component 83 and the second conductive component 88 together, and is positioned towards the side of the current collecting elements of the two EC bundles 70. The base 87 of the current collecting terminal 85 preferably comprises a cut-away aperture 55 in the central portion of the current collecting terminal 85 in order to facilitate the folding or bending of the current collecting terminal 85, as will be described in more detail below.

The current collecting terminal 85 is preferably formed of copper, however, it can also be made of any other ductile and conductive material such as brass, gold, silver, aluminum, and alloys thereof, without departing from the spirit of the invention.

For the purposes of simplicity, the remainder of the specification will describe current collecting terminal 82. It should, however, be appreciated that anything described herein below with respect to current collecting terminal 82 also applies to current collecting terminal 85.

Figure 4:
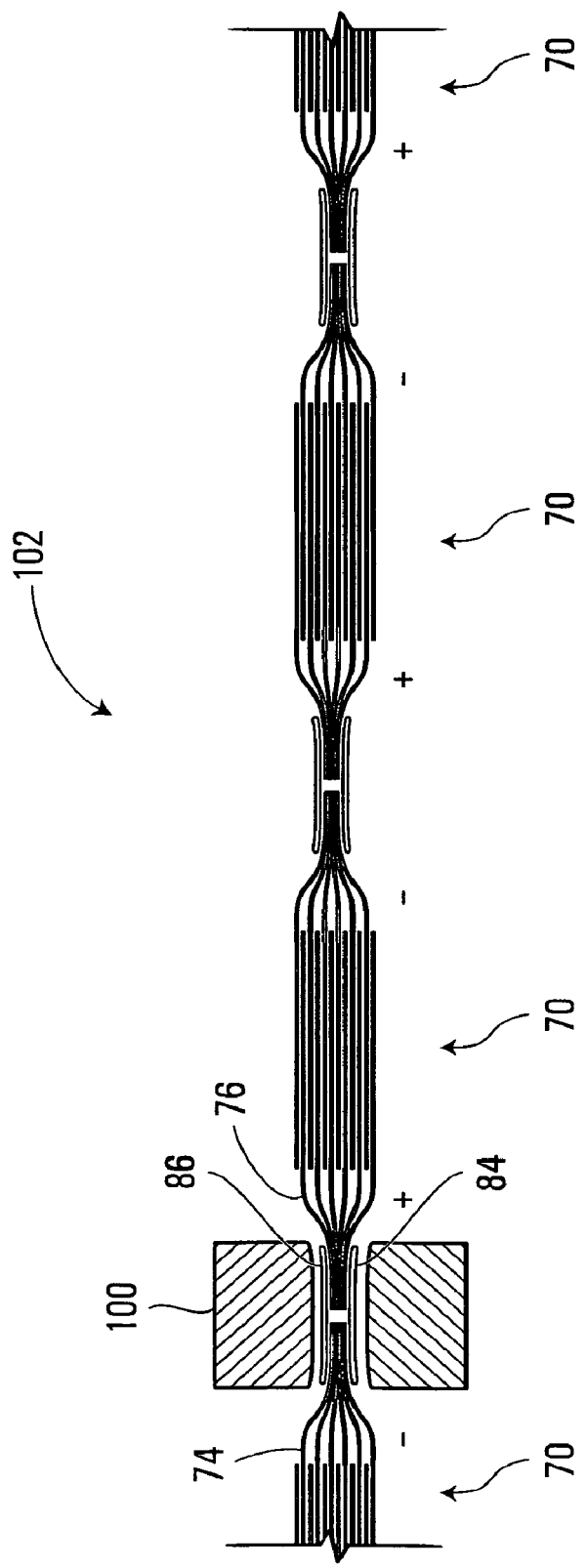

Shown in FIG. 4 is a schematic diagram of a manufacturing process for connecting EC bundles 70 together via current collecting terminals 82. In the non-limiting embodiment shown, the EC bundles 70 are being connected together in series. More specifically, the EC bundles 70 are arranged in a spaced-apart relationship with the anode current collecting elements 74 and the cathode current collecting elements 76 facing each other. These spaced-apart EC bundles 70 are then fed through a terminal application device 100. The terminal application device 100 is operative to position the first and second conductive components 84 and 86 of the current collecting terminals 82 in proximity to the current collecting elements of the EC bundles 70. In a non-limiting embodiment, the terminal application device 100 is then operative to exert a pressure on the first and second conductive components 84 and 86 such that they form a mechanical connection with the current collecting elements 74 and 76 of two EC bundles 70. Preferably, the pressure is applied with a punch or a crimping tool to produce a strong mechanical connection between the current collecting terminal 82 and the current collecting elements 74 and 76. Generally, the crimping pressure alone is sufficient to bind the current collecting terminals with their associated current collecting elements, and bind the current collecting elements together. However, additional or other binding means (e.g., ultrasonic welding, riveting, laser welding, arc welding, pressure welding, soldering, adhesives, etc.) may be required in certain circumstances to improve the mechanical connections and therefore the electrical connections between all the various components.

Once the current collecting terminals 82 are securely connected to the positive and negative current collecting elements 74 and 76 of two EC bundles 70, the current collecting terminal extends continuously between the two EC bundles 70, without any breaks. Once connected, the EC bundles 70 move forward such that the terminal application device 100 can then apply a current collecting terminal 82 to the positive and negative current collecting elements 74 and 76 of a subsequent pair of EC bundles 70. In this manner, a string of EC bundles 102, such as that depicted in FIG. 4, is formed. An advantage of the manufacturing process described above lies in its simplicity, which causes it to be easily automated.

Although FIG. 4 shows the EC bundles 70 being interconnected in series by the terminal application device 100, it should be understood that the terminal application device 100 can also interconnect EC bundles 70 together in parallel. When connecting the EC bundles 70 together in parallel, the EC bundles 70 are arranged in a spaced-apart relationship with the anode current collecting elements 74 facing each other, and the cathode current collecting elements 76 facing each other.

Figure 5:
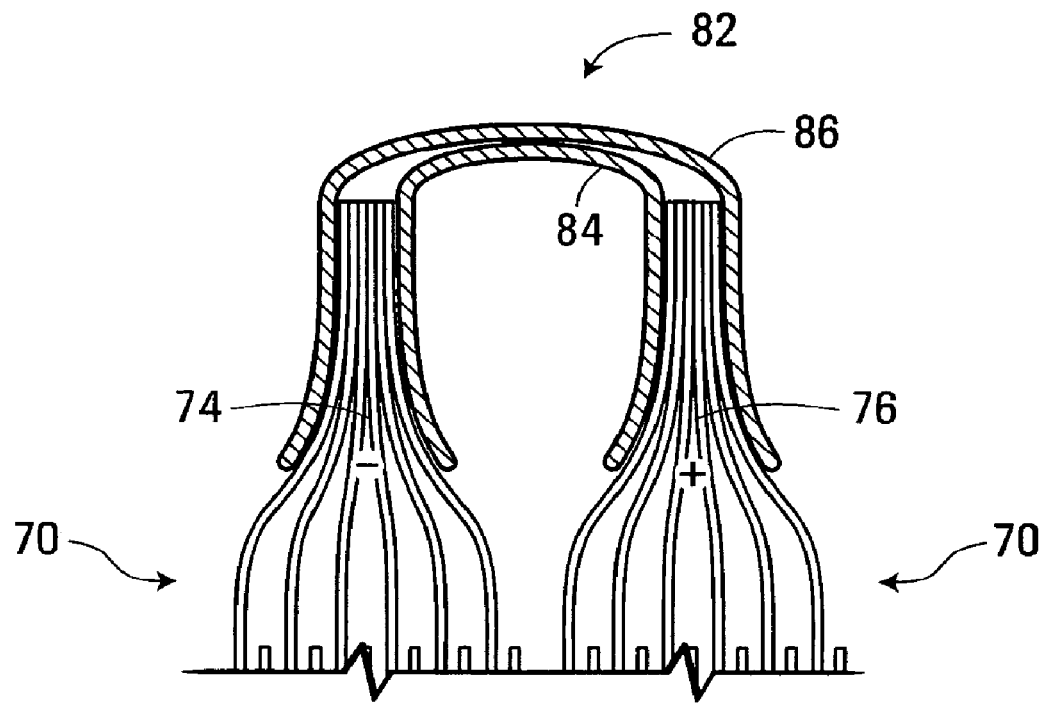

Referring back to the arrangement depicted in FIG. 4, once a plurality of EC bundles 70 have been connected together via current collecting terminals 82, they are then formed into a configuration in which they are suitable for use within an energy storage device, such as a battery. More specifically, the current collecting terminals 82 are bent or folded, as shown in FIG. 5. By folding the current collecting terminals 82 by approximately 180 degrees, the EC bundles 70 are positioned in a side-by-side relationship, such as to facilitate their arrangement within an electrochemical battery. An insulating film (not shown) is positioned between the EC bundles 70 so as to separate and isolate them. It should be appreciated that the process of folding the current collecting terminal 82 in the manner shown in FIG. 5, can be easily automated, in order to simplify production.

In a non-limiting example of implementation, the first conductive component 84 and the second conductive component 86 are of different lengths. For example, in the non-limiting embodiment shown in FIG. 5, the second conductive component 86 is longer than the first conductive component 84. This enables the second conductive component 86 to fold over the first conductive component 84 without stretching or damaging its connection with the current collecting elements 74 and 76 of the two EC bundles 70. Although FIG. 5 shows the second conductive component 86 as being longer than the first conductive component 84, it is also possible for the first conductive component 84 to be longer than the second conductive component 86.

Figure 6:
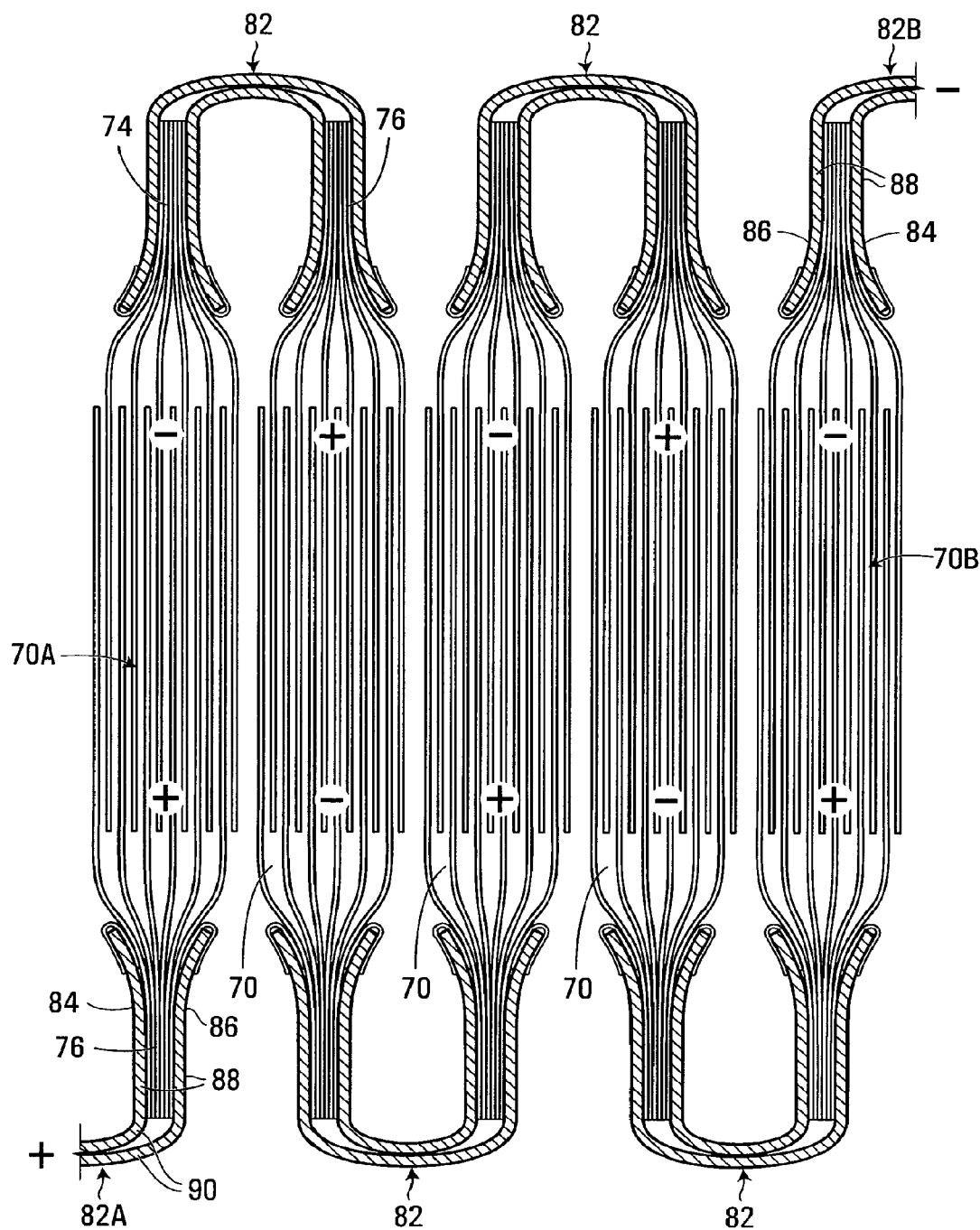
FIG. 6 is a cross-sectional view of a plurality of EC bundles similar to those depicted in FIG. 5, the EC bundles being disposed in a side-by-side relationship and being electrically connected in series via current collecting terminals.

Shown in FIG. 6 is a non-limiting example of a plurality of EC bundles 70 connected together in series via current collecting terminals 82. The EC bundles 70 have been assembled into a battery or energy storage device by folding or bending the successive EC bundles 70 at their current collecting terminals 82 into an accordion or zigzag configuration. As shown, the current collecting terminals 82 are each connected to the anode current collecting elements 74 of one EC bundle 70 and to the cathode current collecting elements 76 of another EC bundle 70, in order to form an uninterrupted chain of EC bundles 70 connected in series. As illustrated, the EC bundles 708 are neatly folded into a compact package.

The negatively charged current collecting elements 74 of each EC bundle 70 are in electrical connection with the positively charged current collecting elements 76 of an adjacent EC bundle 70 such that the entire pack of EC bundles 70 is connected in series. An advantage associated with connecting a plurality of EC bundles 70 together in series using current collecting terminals 82, is that for high power applications requiring high density current, it obviates the need of connecting each EC bundle via cumbersome high gauge electrical cables to support the high current density. Indeed, the current collecting terminals 82 provide the necessary surface area required to carry high density current and replace high gauge electrical cables. The resulting assembly of EC bundles 70 is much more compact than connecting each EC bundle 70 in series through heavy cables that are typically difficult to bend. The current collecting terminals 82 have a high current carrying capacity per volume. The pack of EC bundles 70 is connected to the main positive and negative electrical terminals of the battery through a single set of electrical leads connected to the cathode collecting elements 76 of the first EC bundle 70A of the stack, and the anode collecting elements 74 of the last EC bundle 70B of the stack. These electrical leads are then routed to the battery terminals.

The use of current collecting terminals 82 provides an efficient means of crimping the current collecting elements 74 and 76, assembling and connecting a plurality of EC bundles 70 in series and packaging the assembly into a compact battery well adapted for high power applications.

More specifically, at the cathode collecting elements 76 of the first EC bundle 70A, is positioned a current collecting terminal 82A. The first end 88 of the current collecting terminal 82A is compressed around the cathode collecting elements 76, and the second end 90 is left open. The second end 90 thereby provides a suitable connection point for an electrical lead that connects the EC bundles 70 to the positive battery posts or terminals. Likewise, a current collecting terminal 82B is positioned around the anode collecting elements 74 of the last EC bundle 70B. As such, the first end 88 of the current collecting terminal 82B is compressed around the anode collecting elements 74, and the second end 90 is left open, thereby providing a suitable connection point for an electrical lead that connects the EC bundles 70 to the negative battery posts or terminals. It should be understood that electrical leads for connecting the EC bundles to the battery posts or terminals could be connected by other means directly to the current collecting elements of the end EC bundles 70A and 70B. In such a situation, the current collecting terminals 82A and 82B would not be present.

Large gauge wires (not shown) can connect the EC bundles 70 to the positive and negative terminals (not shown) of an electrochemical battery. Although not illustrated, each pair of EC bundles are separated by an insulating film. Also not shown, sheet-like heating elements may be inserted between selected pairs of EC bundles 70 to raise or maintain the temperature of the assembly of EC bundles 70 at an optimum level.

Although only five EC bundles 70 are shown in FIG. 6, it should be appreciated that more or less EC bundles 70 can be connected together in the manner shown in FIG. 6, for use in a battery or energy storage device, without departing from the spirit of the invention.

Figure 7:
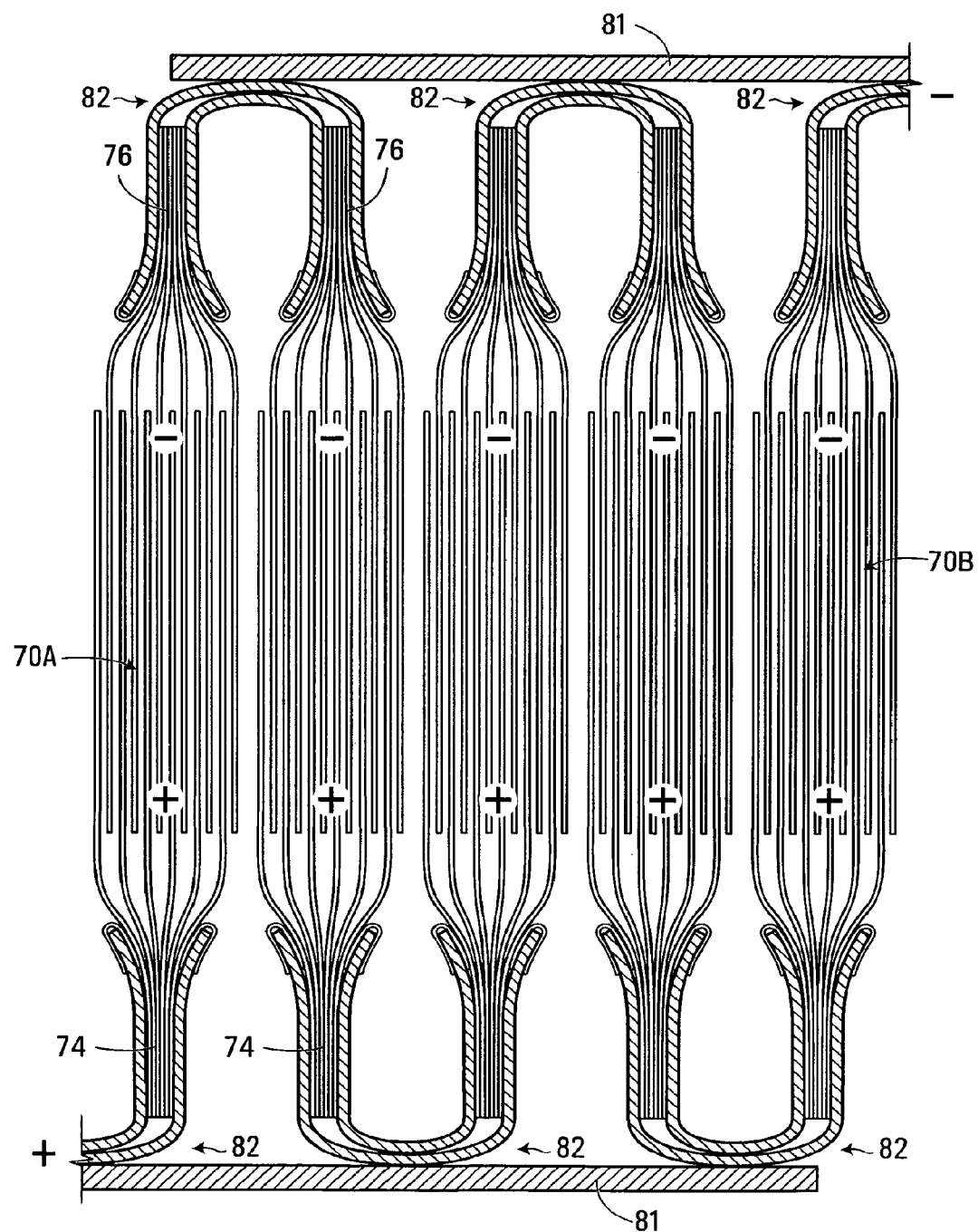
FIG. 7 is a non-limiting cross-sectional view a plurality of EC bundles disposed in a side by side relationship and electrically connected in parallel.

Shown in FIG. 7 is a non-limiting example of a plurality of EC bundles 70 connected together in parallel. Once again, these EC bundles 70 have been assembled into a configuration suitable for a battery or energy storage device by folding or bending the successive EC bundles 70 at the current collecting terminals 82 in an accordion configuration. As shown, the current collecting terminals 82 are connected to cathode current collecting elements 76 of two EC bundles 70 and are connected to anode current collecting elements 74 of two EC bundles 70, in an alternating manner.

In order to connect the stack of EC bundles 70 configured in parallel in the manner shown in FIG. 7 to the positive and negative terminals of an electrochemical battery, electrical leads 81 are necessary for interconnecting all the current collecting terminals 82 connected to the positive ends of the EC bundles 70. The lead 81 is then connected to a positive terminal of the electrochemical battery. Likewise, all current collecting terminals 82 connected to the negative ends of the EC bundles 70 are connected together via an electrical lead 81. The electrical lead is then connected to the negative terminal of the electrochemical battery. The electrical leads 81 can be electrical wires soldered onto each current collecting terminals 82. Multiple variations are possible such as for example, having all current collecting terminals 82 connected to the positive ends of the EC bundles 70 connected to a busbar leading to the positive battery terminal, and all current collecting terminals 82 connected to the negative ends of the EC bundles 70 connected to a busbar leading to the negative battery terminal.

The EC bundle assembly connected in parallel shown in FIG. 7 capitalizes on the ease of manufacturing and assembling resulting from the use of current collecting terminals 82 with the addition of the further step of connecting the latter in parallel by any means known to those skilled in the art to form a battery.

Although only five EC bundles 70 are shown in FIG. 7, it should be appreciated that more or less EC bundles 70 can be connected together for use in a battery or energy storage device, without departing from the spirit of the invention.

It should also be appreciated that combinations of series and parallel connections using the various configurations of current collecting terminals described above can be contemplated without departing from the scope and spirit of the invention.

Figure 8:
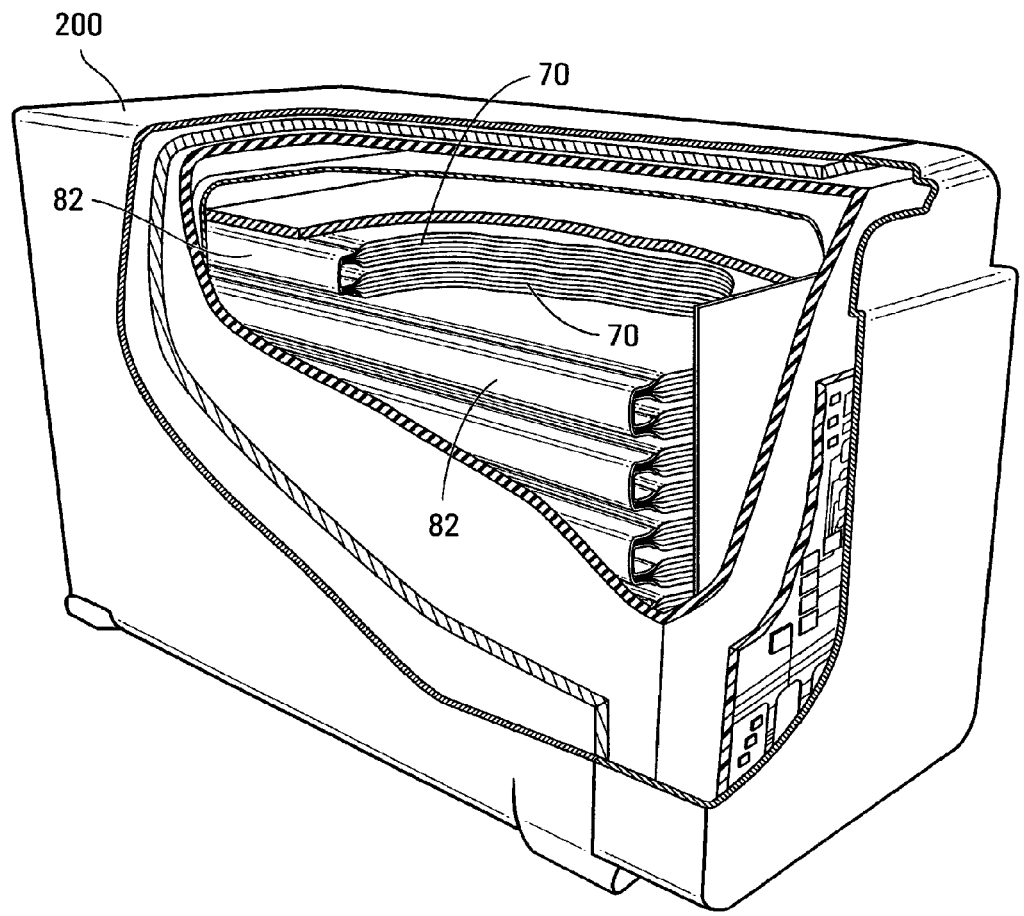
FIG. 8 is a non-limiting example of implementation of a battery containing a plurality of EC bundles connected together via the current collecting terminals in accordance with the present invention.

Shown in FIG. 8 is a non-limiting example of an electrochemical battery 200 comprising a stack of EC bundles 70 connected in series via current collecting terminals 82, as described above.

Although various embodiments have been illustrated, this was for the purpose of describing, but not limiting, the invention. Various modifications will become apparent to those skilled in the art and are within the scope of this invention, which is defined more particularly by the attached claims.

We claim:

1. A method for making a battery, said method comprising:
   a) providing a plurality of Electrochemical Cell (EC) bundles, each EC bundle comprising a plurality of Electrochemical Cells (ECs), each Electrochemical Cell comprising: i) a sheet-like positive electrode having a projection extending from a first end of said Electrochemical Cell; ii) a sheet-like negative electrode having a projection extending from a second end of said Electrochemical Cell; iii) an electrolyte between said electrodes;

b) providing a current collecting terminal having a first end and a second end; electrically connecting the projections of the sheet like electrodes extending from one end of a first EC bundle together via the first end of the current collecting terminal; electrically connecting the projections of the sheet like electrodes extending from one end of a second EC bundle together via the second end of the current collecting terminal such that the first EC bundle and the second EC bundle are mechanically and electrically connected together and form a string;

wherein a plurality of EC bundles are assembled and electrically connected together via current collecting terminals to form a continuous string of EC bundles and thereafter folding the string of successive EC bundles into an accordion or zigzag configuration by bending the current collecting terminals connecting the EC bundles together such that the EC bundles are positioned in a side by side relationship.

2. A method as defined in claim 1, wherein the plurality of EC bundles is electrically connected together in series.

3. A method as defined in claim 1, wherein the plurality of EC bundles is electrically connected together in parallel.

4. A method as defined in claim 1, wherein the current collecting terminal comprises a first conductive component and a second conductive component.

5. A method as defined in claim 4, further comprising mechanically crimping the first conductive component and the second conductive component about the projections of the sheet-like electrodes of the first EC bundle and the second EC bundle.

6. A method as defined in claim 4, further comprising welding the current collecting terminal to the projections of the sheet-like electrodes of the first EC bundle and the second EC bundle.

7. A method as defined in claim 4, wherein the first conductive component and the second conductive component of the current collecting terminal are separate components.

8. A method as defined in claim 7, wherein the first conductive component and the second conductive component of the current collecting terminal are of different lengths.

9. A method as defined in claim 1, wherein the current collecting terminals are bent by approximately 180 degrees.

* * * * *